United States Patent [19]

Ludwig et al.

[11] 4,363,399
[45] Dec. 14, 1982

[54] BELT CONVEYOR

[76] Inventors: Peter Ludwig; Heinrich Hörstermann, both of Rosenweg 9, 5982 Neuenrade, Fed. Rep. of Germany

[21] Appl. No.: 196,297

[22] Filed: Oct. 14, 1980

Related U.S. Application Data

[63] Continuation of Ser. No. 969,219, Dec. 13, 1978, abandoned.

[30] Foreign Application Priority Data

Dec. 17, 1977 [DE] Fed. Rep. of Germany ....... 2756363

[51] Int. Cl.³ ............... B65G 23/14; B65G 15/08
[52] U.S. Cl. ............................ 198/833; 198/830
[58] Field of Search ............ 198/812, 823, 824, 825, 198/830, 833, 862

[56] References Cited

U.S. PATENT DOCUMENTS

| | | | |
|---|---|---|---|
| 1,726,555 | 9/1929 | Gammeter | 198/833 X |
| 2,576,217 | 11/1951 | Eggleston | 198/812 X |
| 3,268,065 | 8/1966 | Thomson | 198/833 |
| 4,061,223 | 12/1977 | McGinnis | 198/833 X |

*Primary Examiner*—Jeffrey V. Nase
*Attorney, Agent, or Firm*—Michael J. Striker

[57] ABSTRACT

A belt conveyor has a carrying belt unit including a carrying belt which has an upper load run and a plurality of supporting rollers to support the latter, and a friction belt unit having a friction belt which has one run in frictional contact with the upper load run of the carrying belt. The friction belt is guided by a plurality of bearing rollers and deviating rollers, the latter being downwardly offset relative to the bearing rollers. The upper load run is trough-shaped and has two lateral inclined portions supported by inclined supporting rollers, and a central portion with which the one run of the friction belt is in contact. The deviating rollers are spaced from one another by a distance which is at most equal to the width of the carrying belt.

4 Claims, 16 Drawing Figures

BELT CONVEYOR

This is a continuation of application Ser. No. 969,219, filed Dec. 13, 1978, now abandoned.

BACKGROUND OF THE INVENTION

The present invention relates to a belt conveyor. More particularly, it relates to a belt conveyor which has a trough-shaped upper load-carrying run whose inclined lateral portions are supported by inclined supporting rollers, whereas a flat central portion of the run is in frictional contact with one run of a friction belt guided by bearing rollers.

Belt conveyors of the above-mentioned general type are disclosed in the German Pat. No. 592,657 and German Offenlegungsschrift No. 2,412,156. It has been recognized that in such belt conveyors the load which is required for transmission of the driving force and applied by the carrying belt to the friction belt, is distributed nonuniformly over the contacting surfaces of the belts. Since both the carrying belt and the friction belt are flexible in a certain range, considerable tension develops because of the varying forces between the lower surface of the carrying belt and the upper surface of the friction belt. This results in the driving force being transmitted to the carrying belt only under conditions of relatively great friction slip, which leads to a considerable wear between the carrying belt and the friction belt, so that finally the carrying belt does not run parallel to the friction belt. Especially in high-speed conveyors the latter-mentioned disadvantage has the result that the carrying belt, in spite of the fact that it is supported by the lateral supporting rollers, becomes separated from the friction belt and loses its frictional contact with the same.

In order to eliminate the above-mentioned disadvantages, a belt conveyor with an intermediate drive has been proposed in the German Pat. No. 907,877. This intermediate drive is formed as a sprocket chain on which a plurality of discs are consecutively arranged. The discs have a friction face which engages with the central region of the conveyor belt and drives both runs of the conveyor belt by the friction contact. The discs of the sprocket chain, provided with friction layers form an interrupted support so that the band tension between the conveyor belt and the discs can be compensated.

The above-described known conveyor belt with the intermediate drive has the disadvantage that the sprocket chain with the bearing discs can provide for only a small speed of movement. A further disadvantage of this conveyor belt with the intermediate drive is that the conveyor belt sags between the bearing discs and thereby rubs on the edges of the bearing discs, which results in a high degree of wear.

SUMMARY OF THE INVENTION

Accordingly, it is an object of the present invention to provide a belt conveyor which avoids the disadvantages of the prior art.

More particularly, it is an object of the present invention to provide a belt conveyor in which no tension develops between the carrying belt and the friction belt, and the wear of these belts is very low.

In keeping with these objects and with others which will become apparent hereinafter, one feature of the present invention resides, briefly stated, in that a plurality of deviating rollers are provided between bearing rollers of a friction belt which engages a carrying belt of the conveyor, the deviating rollers being offset downwardly of the bearing rollers and being spaced from one another lengthwise of the belt by a distance which is at most equal to the double width of the carrying belt.

In such a construction, the upper run of the friction belt (which is located below the upper run of the carrying belt) is repeatedly urged against and then away from the lower side of the carrying belt, so that no tension develops between the friction belt and the carrying belt. The thus-performed driving of the carrying belt which is intermittent at regular distances results in a self-adjusted slip between the carrying belt and the friction belt so that no great damaging forces can act upon the carrying belt. Since the friction force which acts upon the carrying belt continuously travels through the carrying belt, no local overloading takes place, whereby the wear of the carrying belt and the friction belt is small.

It is advantageous when the carrying belt is provided, on the lower side of its central region, with a layer of a highly wear-resistant material. Such a layer has relatively small friction characteristics relative to the friction belt; however, it has the advantage that it prevents local overloading of the carrying belt under the action of a driving force.

In the belt conveyor in accordance with the present invention, the carrying belt can be driven at a higher speed than before and runs completely parallel to the friction belt so that the carrying belt and the friction belt can also move along a curved path.

In accordance with another advantageous feature of the present invention, the bearing rollers and the deviating rollers of the friction belt may have an identical diameter, and the axes of the deviating rollers may be located in a plane which is situated below the plane wherein the axes of the bearing rollers are located. In this case each of the deviating rollers may be arranged between two bearing rollers. The carrying belt lies on the friction belt between the bearing rollers of the latter so that a relatively high driving force can also be transmitted from the friction belt to the carrying belt.

The friction belt may be formed as a flat band, particularly as a toothed band. It also may be formed as a chain or a cable or rope. When the friction belt is formed by a relatively small element it is advantageous to provide several such friction belts located parallel and laterally adjacent to one another. In this case it is advantageous when at least one of the friction belts runs in a phase which is opposite to the phase of the other friction belts. The second-mentioned friction belts are guided about one deviating roller whereas the first-mentioned friction belt lies on the carrying belt.

In accordance with a further feature of the present invention, the bearing rollers and the deviating rollers of the friction belts are located between the side walls of a frame of a drive unit, the side walls being formed as a parallel linkage including a plurality of flat bars articulately connected with one another in at least three pivotal points. The side walls are connected to the frame through the upper pivotal points wherein the axes of the bearing rollers are located, and the middle pivotal points wherein the axes of the deviating rollers are located. When the frame holding the bearing rollers, the deviating rollers and required driving rollers is so constructed, it is possible to move the side walls more or less so that they match to the length of the required drive unit. Furthermore, it is possible by different movements of both side walls of the frame of the drive unit and thereby the friction belt, to attain a desired curvature so that the drive unit can satisfy the respective requirements made thereto.

Since the drive unit of the belt conveyor can be curved and shortened or elongated in accordance with the applied force, therefore in accordance with a further feature of the present invention, it is proposed to form the walls of the frame accommodating the supporting rollers of the carrying belt, also as a parallel linkage. Such a frame can match to land unevenness and also can be shortened or elongated and curved in a horizontal plane, whereby the belt conveyor can run along a curved land path. When the belt conveyor is so constructed, it is possible to set the drive units independently of the frame of the carrying belt. It is also possible to connect the frames of the drive unit with the frame of the carrying belt so that by elongating, shortening or curving of the big frame of the carrying belt the frames of the drive units will simultaneously be respectively adjusted.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
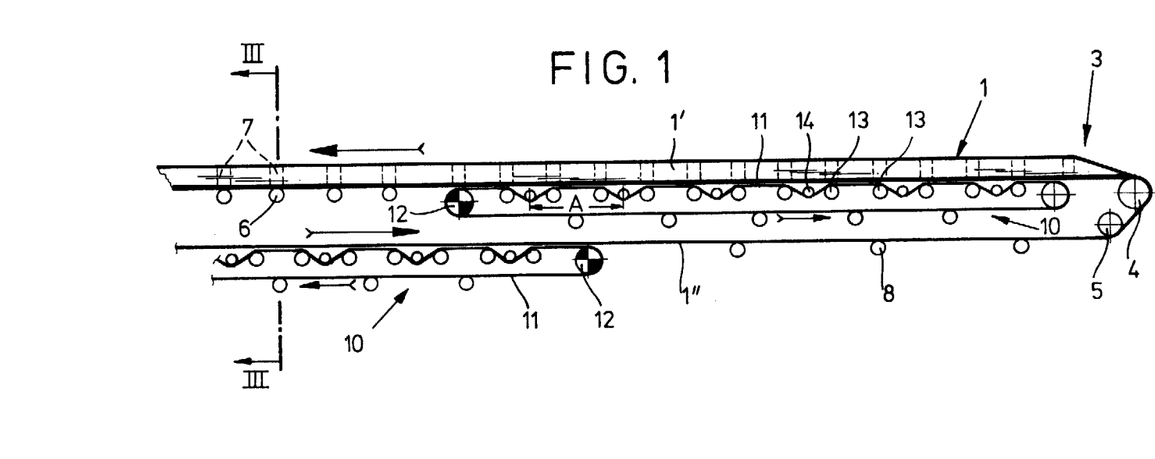
FIG. 1 is a side view showing a loading end of a belt conveyor in accordance with the present invention.
Figure 2:
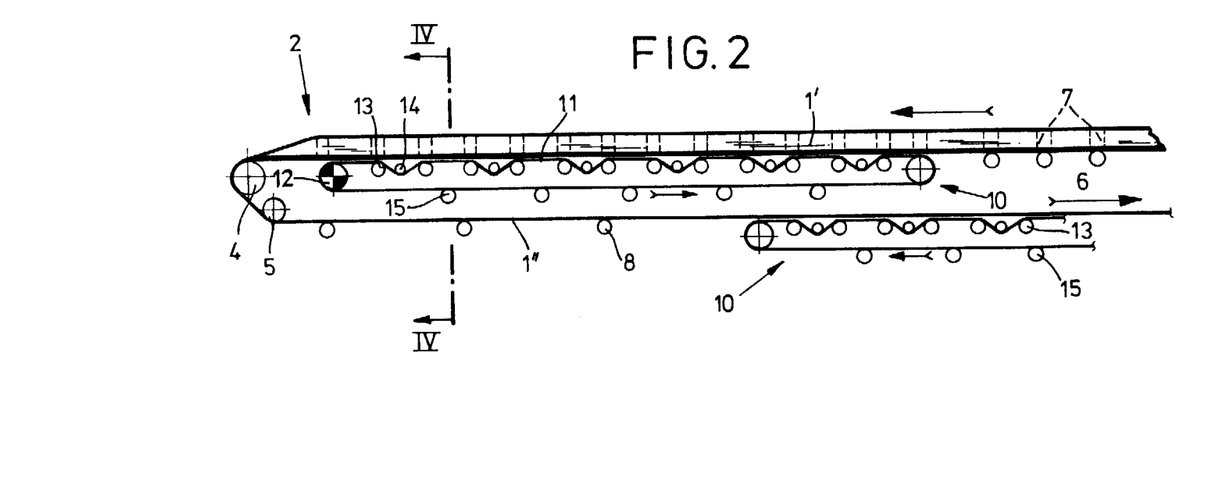
FIG. 2 is a view showing an unloading end of the belt conveyor with two drive units for a load run and one drive unit for an idle run of a carrying belt.

A belt conveyor in accordance with the present invention has an endless carrying belt 1 for receiving loads to be conveyed, as shown in FIGS. 1 and 2. The carrying belt 1 has an upper run which is formed as a trough-shaped load run 1' and a lower run which is formed as a flat idle run 1". A loading end of the belt conveyor is identified by reference numeral 3 whereas an unloading end thereof is identified by reference numeral 2.

Figure 3:
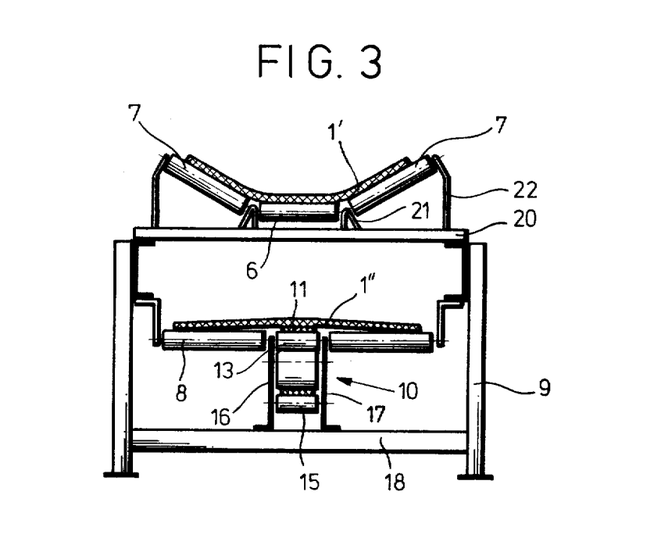
FIG. 3 is a view showing a section taken on the line III—III in FIG. 1.

For supporting and guiding the carrying belt 1, a plurality of rollers is provided. They include a reversing roller 4 and a tension roller 5 at the loading end 3 and the unloading end 2, horizontally supporting rollers 6 which support the load run 1' in its flat central region, inwardly inclined supporting rollers 7 which support the inclined regions of the trough-shaped load run 1', and supporting rollers 8 which support the idle run 1". As can be seen from FIGS. 3 and 4, the supporting rollers 6, 7 and 8 are rotatably mounted in a frame 9.

Three drive units 10 serve for driving the carrying belt 1 shown in FIGS. 1 and 2. Two drive units 10 engage with the load run 1', whereas one drive unit 10 engages with the idle run 1". Each of the drive units includes at least one endless friction belt 11 which is driven by at least one driving roller 12 and has an upper run 11' which is in frictional contact with the carrying belt 1. The upper run 11' of the friction belt 11 moves on supporting rollers 13 which are located at equal distances from one another and perform the functions of the horizontally supporting rollers 6 of the carrying belt 1. Deviating rollers 14 which deviate the upper run of the friction belt downwardly, are located at distances A from one another. Between two successive deviating rollers 14 two or three supporting rollers 13 may be arranged.

In accordance with the embodiment shown in FIGS. 1 and 2, the axes of the supporting rollers 13 and the deviating rollers 14 of the upper run of the friction belt 11 are located in a common plane, and each deviating roller 14 located between a pair of the supporting rollers 13 has a substantially smaller diameter than the supporting rollers so that, the load run 1' which somewhat sags above the deviating rollers 14 does not contact with the deviating rollers 14 which rotate in a direction opposite to the direction of conveying. However, for purposes of easier manufacture and mounting, the supporting rollers 13 and the deviating rollers 14 may have an identical diameter, in which case the deviating rollers 14 are located lower than the supporting rollers 13.

The lower run of the friction belt 11 is guided by auxiliary rollers 15 which support the lower run. The driving rollers 12, the supporting rollers 13, the deviating rollers 14 and the auxiliary rollers 15 are located between side walls 16 and 17 of the drive unit 10. The drive unit 10 for the idle run 1" is mounted on a lower traverse 18 of the frame 9, and the drive unit 10 for the load run 1' is mounted on a middle traverse 19 of the frame 9. Bearing brackets 21 and supporting brackets 22 for bearing the supporting rollers 6 and 7 are mounted on an upper traverse 20 of the frame 9.

Figure 4:
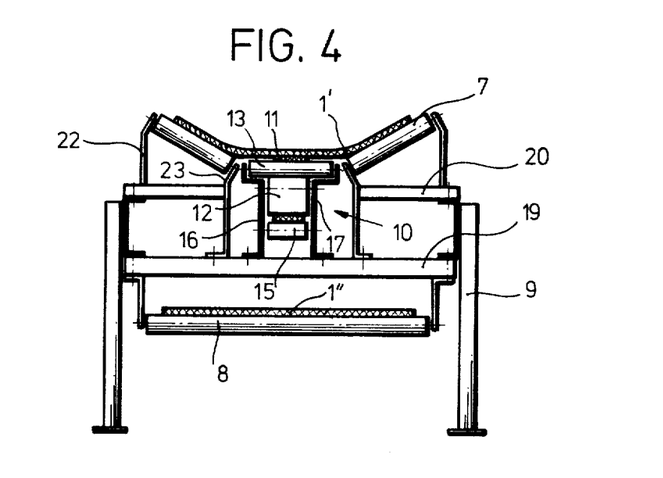
FIG. 4 is a view showing a section taken on the line IV—IV in FIG. 2.

As shown in FIG. 4, the upper traverse 20 in the region of the belt conveyor where the drive unit 10 engaging with the load run 1' is located, is subdivided into two traverses 20 whose inner ends are mounted on the middle traverse 19 of the frame 9 through partitions 23. Inner ends of the inclined supporting rollers 7 are supported on upper portions of the partitions 23, the upper portions being bent off.

In the belt conveyor shown in FIGS. 1 and 2, the drive unit 10 has one deviating roller 14 between each pair of the supporting rollers 13. In the regions between the successive supporting rollers 13, the lower side of the load run 1' is in frictional contact with the friction belt 11. This frictional contact is interrupted at the distance A which substantially corresponds, in accordance with this embodiment, to the width of the carrying belt 1. Thereby, no tension can develop between the friction belt 11 and the carrying belt 1. The frictional contact between the friction belt 11 and the carrying belt 1 is such that the specific friction load is relatively small and thereby only small pulling force can be introduced in the carrying belt 1. By such intermittent pulling of the carrying belt 1 it is possible to drive extremely wide carrying belts with relatively small pulling strength in spite of non-uniform loading thereof at higher speed through wide paths. Since the adherence between the carrying belt and the friction belt can be maintained relatively small, self-adjustable slippage takes place even in the event when the load run is highly loaded.

It is advantageous when the drive units 10 are self-contained structural units which can be, in accordance with the requirements, inserted into the frame 9 of the belt conveyor. The drive units 10 are particularly arranged in the loading region 3 and in the region of inclination. The drive units 10 and the guides of the belt conveyor 1 can be so located that the lower run of the friction belt 11, which moves in a direction opposite to the direction of transportation, is in frictional contact with the inner side of the lower run 1" of the carrying belt 1 and drives the same. The lower run of the friction belt 11 may be so guided by the pressure rollers and deviating rollers that an intermittent pulling movement is performed, as was described with respect to the upper run.

Figures 5, 6:
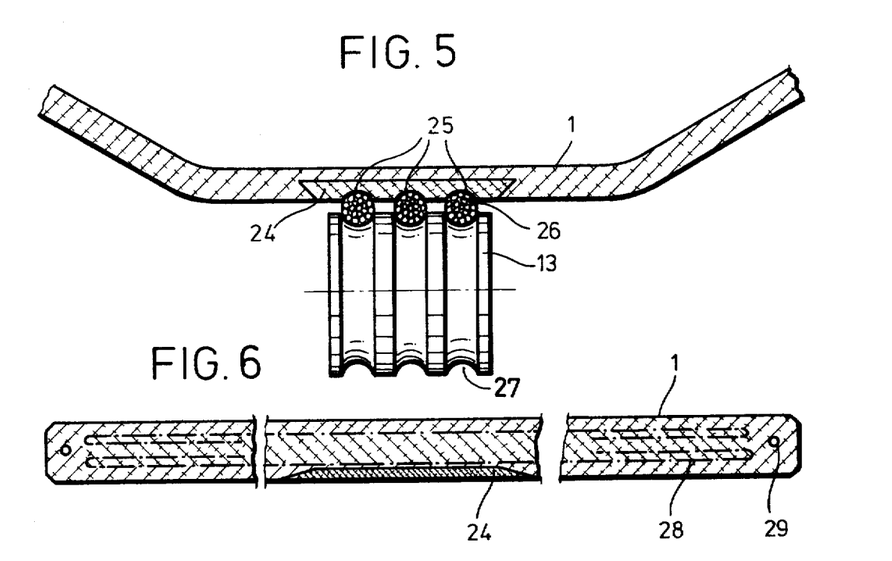
FIG. 5 is a view showing a section of the load run of the carrying belt, and a friction belt which is formed by three cable ropes.
FIG. 6 is a view showing a section of the carrying belt provided with a layer of a highly wear-resistant material in the central region of the same.

As depicted in FIG. 5, the friction belt 11 can be formed by one of several steel cable ropes. In this case, an insert 24 of a highly wear-resistant material is provided on a lower side of the carrying belt 1 and has a plurality of longitudinal grooves 25 in which the steel cable ropes 26 engage. The supporting rollers 13 and the deviating rollers 14 may be provided with annular grooves 27 in which the steel cable ropes 26 are guided.

FIG. 6 shows a carrying belt which is characterized in that it is driven by a flat friction belt. In accordance with this, the lower side of the highly wear-resistant insert 24 is flat. The carrying belt is provided with a transverse reinforcement 28. Since only small pulling force acts upon the carrying belt 1, a longitudinal reinforcement 29 may be relatively weak and serves only for edge reinforcing.

Figure 7:
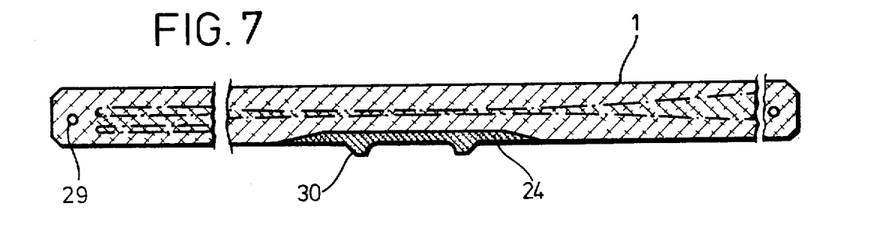
FIG. 7 is a view showing a section corresponding to that shown in FIG. 6, but wherein the layer of the highly wear-resistant material has ribs between which the friction belt is guided.

The highly wear-resistant insert 24 shown in FIG. 7 has two longitudinal ribs 30. A friction belt formed by an upwardly flatted steel cable rope can be guided between the ribs 30 of the insert 24.

Figure 8:
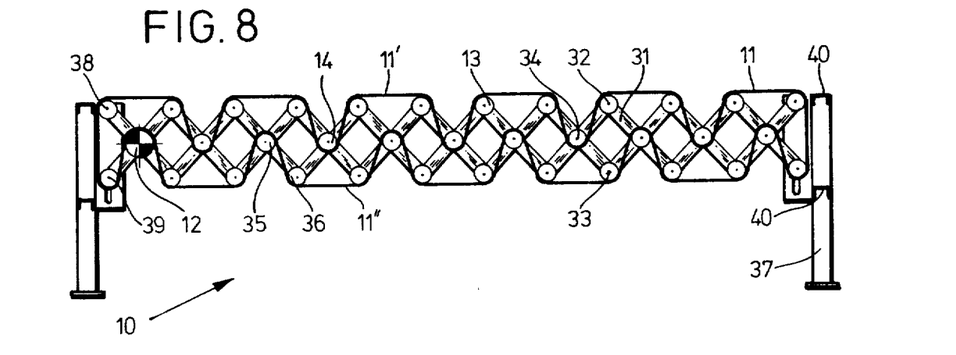
FIG. 8 is a side view of a drive unit which can be shortened or elongated as well as curved.

FIG. 8 shows a drive unit whose frame has side walls formed as an articulated parallel linkage including a plurality of flat bars 31 which are articulately connected with one another. The supporting rollers 13 of the friction belt 11 are located in upper knee points 32 of the side wall, whereas the deviating rollers 14 of the friction belt 11 are located in cross points 34.

In accordance with the embodiment shown in FIG. 8, a lower run 11" of the friction belt 11 is guided similarly to an upper run 11' so that the lower run 11" of the friction belt 11 can also be brought into intermittent frictional contact with the lower run 1" of the carrying belt 1. The lower run 11" of the friction belt 11 is guided by pivot rollers 35 which are located in cross points 34, and about pressure rollers 36 which are located in lower knee points 33 of the side walls 16 and 17.

The drive unit shown in FIG. 8 can be shortened to one fourth of its maximum length or lengthened to four times its minimum length, so that this unit can be adapted to different requirements. For instance, for an ascending path several shortened drive units can be provided, whereas for a descending path of the belt conveyor only one largely increased drive unit can be provided. The drive unit shown in FIG. 8 can match to a curved path by different shortening and elongating of the side walls. Since the friction belt is guided from the outer supporting rollers 13 or pressure rollers 36 to the inner deviating rollers 14 or 35, the length of the required friction belt 11 remains constant in spite of elongating or shortening of the drive unit 10 in wide ranges. When the thus-formed walls are displaced toward one another the pivotal points located in the same plane move closer to each other, and the pivotal points located in different planes simultaneously move away from each other. At the same time, during such displacement the angle of wrapping of the friction belt 11 about the supporting rollers 13, the deviating rollers 14 and 35, and the pressure roller 36 are increased. Thereby, an automatic length adjustment is performed. The length of the friction belt 11 is thus independent of whether the drive unit provided with the thus-formed side walls is more or less compressed or stretched.

The driving roller 12 may be formed as a deviating roller which is located at the unloading end and engages with the idle run 11" of the friction belt. The side walls of the drive frame formed as the above-mentioned parallel linkage, are articulately mounted on supports 37 provided with a fixed pivot 38 for the upper pivotal point of the articulated bars and with a displaceable pivot 39 for the lower pivotal point of the articulated bars 31. The supports 37 are connected with a rigid frame through traverses 40.

Figure 9:
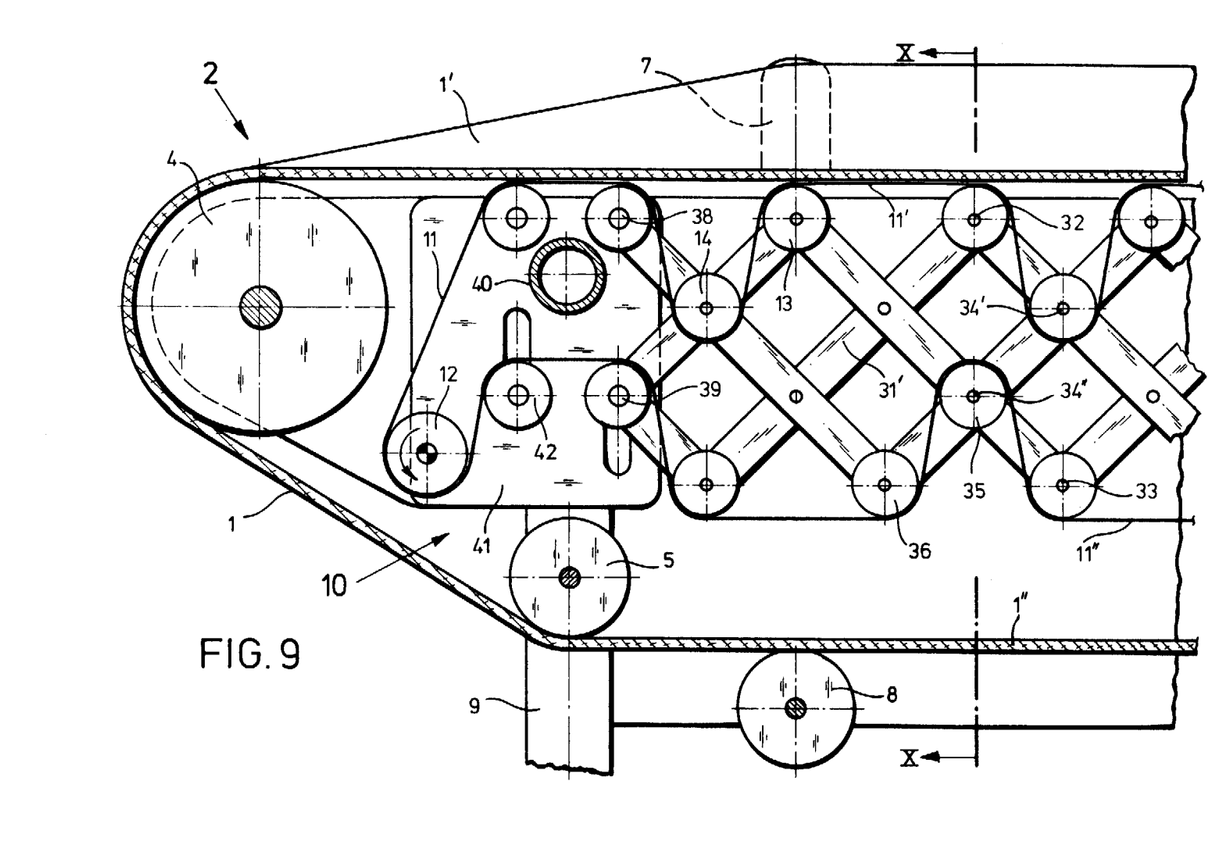
FIG. 9 is a view showing an unloading end of the belt conveyor with the drive unit which can be shortened or elongated.

FIG. 9 shows the unloading end 2 of the belt conveyor with the drive unit 10 whose frame walls are formed by articulated parallel linkage having articulated bars 31' with four pivotal points. In this drive unit, the axes of the deviating rollers 14 for the upper run 11' of the friction belt 11 are located in the upper cross points 34', whereas the deviating rollers 35 of the lower run 11" of the friction belt are located in the lower cross points 34" of the thus-formed walls. Since in the side walls formed as a parallel linkage with four pivotal points a respective articulated bar 31' of the guide of the lower run 11" is independent of the guide of the upper run 11', the lower run 11" can be so guided through more or less usual returns that the length of the friction-belt is constantly independent of the extent to which the walls are compressed or stretched. The friction belt 11 is driven by one driving roller 12 which is mounted in a head wall 41 of a rigid supporting frame of the drive unit. The fixed pivot 38 and the displaceable pivot 39 are arranged on the head wall 41. The head walls 41 may be fixedly connected with one another by a rigid tubular traverse 40. A tension roller 42 is mounted in the head walls 41, the tension roller adapted to adjust the tension of the friction belt 11.

Figure 10:
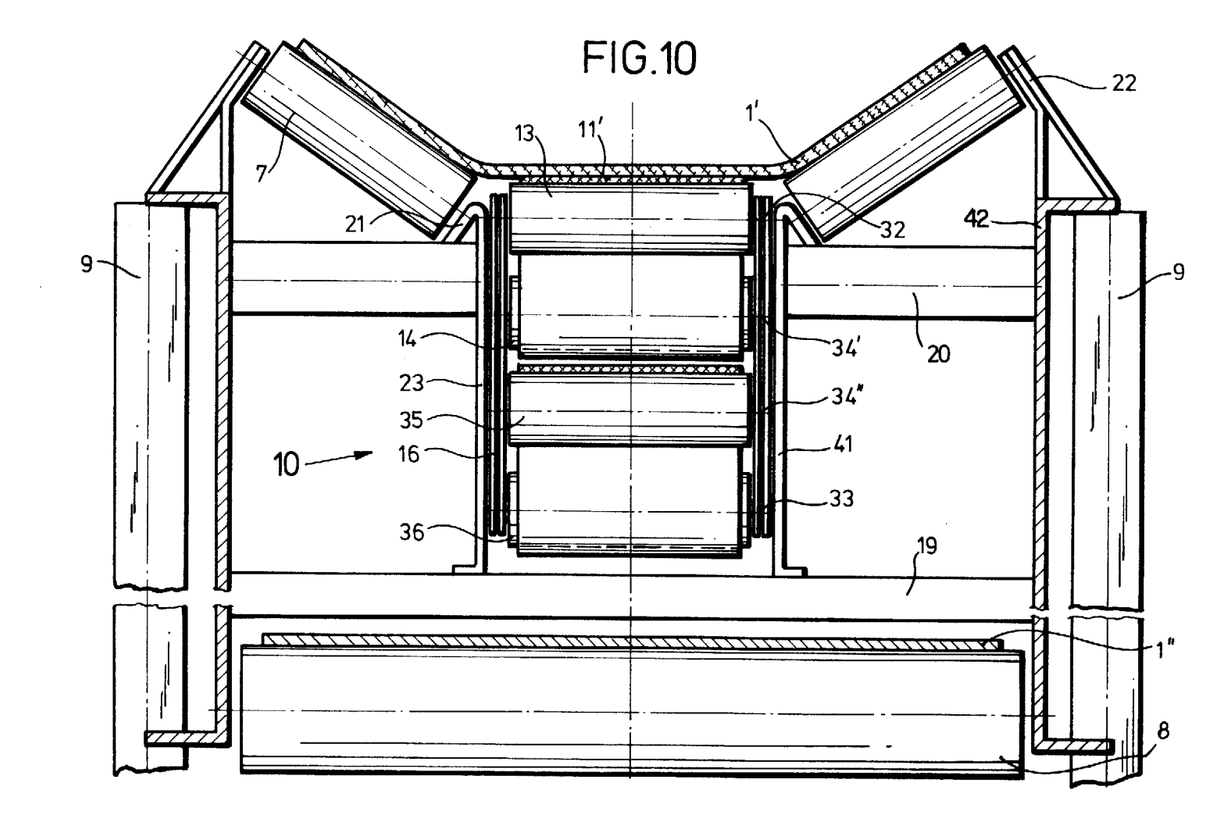
FIG. 10 is a view showing a section taken on the line X—X in FIG. 9.

FIG. 10 shows a cross-section of the belt conveyor shown in FIG. 9. The supporting rollers 7 and 8 as well as 6 of the carrying belt 1 are mounted on the rigid frame 9 whose side walls are formed by an elongated support 42. The frame 9 of the conveyor has the middle traverses 19 whereon the drive unit 10 is supported.

Figure 11:
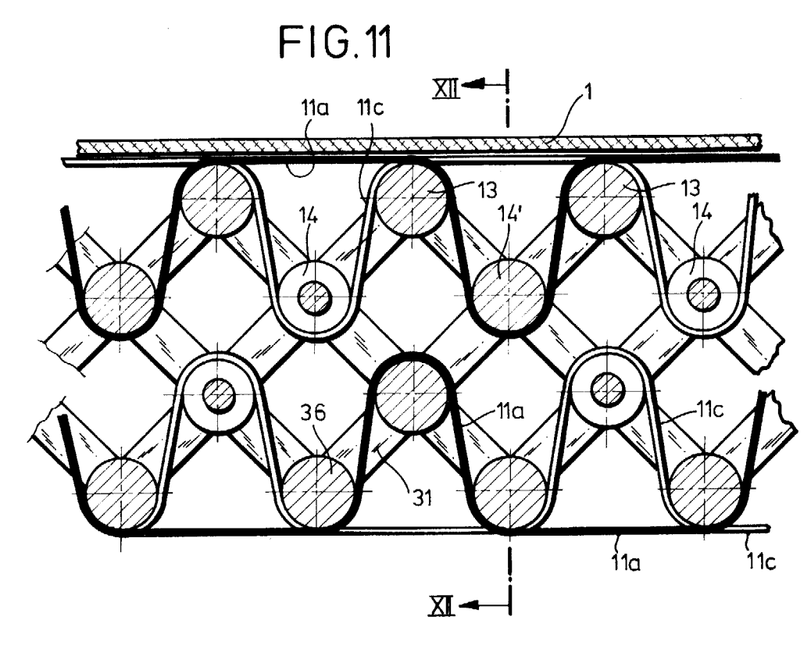
FIG. 11 is a view showing a section taken on the line XI—XI in FIG. 12 and depicting an adjustable drive unit with three friction belts.
Figure 12:
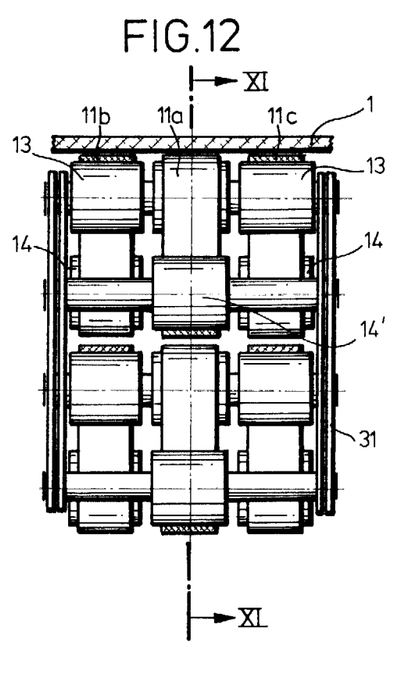
FIG. 12 is a view showing a section taken on the line XII—XII in FIG. 11.

FIGS. 11 and 12 show parts of the drive unit which has a construction similar to that of the drive unit of FIGS. 9 and 10. However, in this drive unit instead of one wide friction belt 11 three respectively smaller friction belts 11a, 11b and 11c are provided, located adjacent to one another. These friction belts are so guided that both outer friction belts 11b and 11c are guided on the same supporting rollers 13 and deviating rollers 14, whereas the middle supporting belt 11a runs in the opposite phase relative to the outer friction belts 11b and 11c and is guided about the deviating rollers 14' located between the deviating rollers 14 and the supporting rollers 13 of the outer friction belts 11b and 11c. By subdividing of a wider friction belt into several smaller friction belts the tension developed between the friction belt and carrying belt and thereby the wear on the lower side of the carrying belt can be reduced. Furthermore, the drive unit in accordance with FIGS. 11 and 12 has the advantage that it can be curved greater, and the friction belts 11a, 11b and 11c follow its curvature and thereby respectively control the carrying belt.

Figure 13:
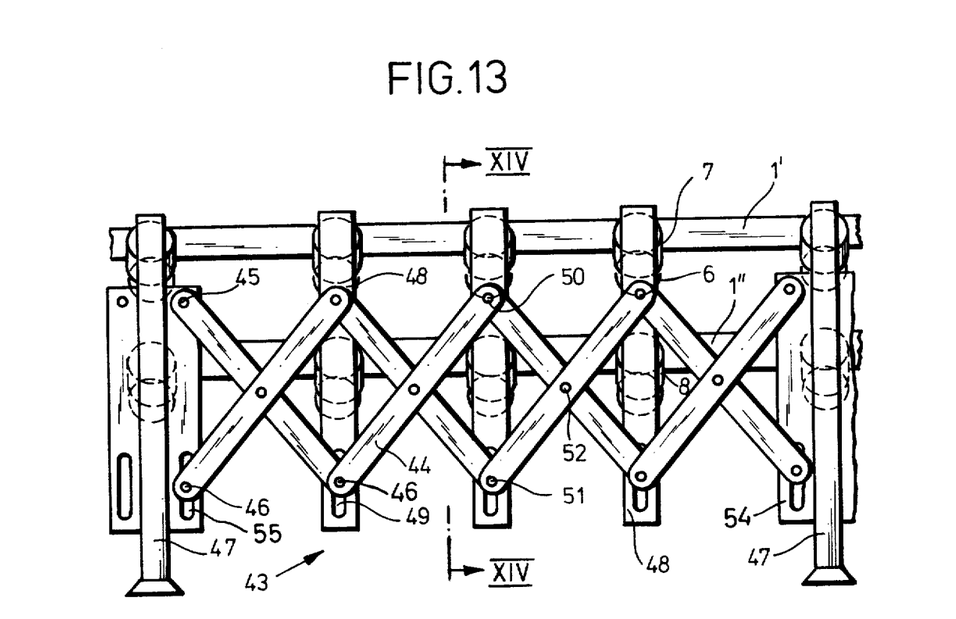
FIG. 13 is a side view of parts of the frame of the belt conveyor, which parts can be shortened and elongated.
Figure 14:
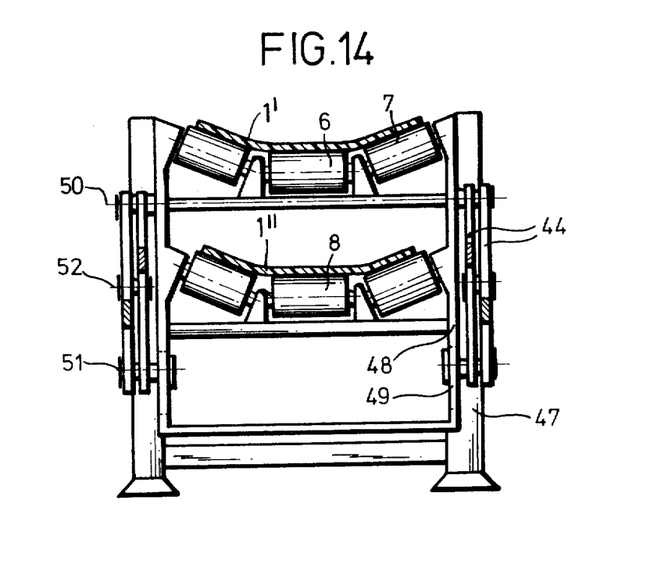
FIG. 14 is a view showing a section taken on the line XIV—XIV in FIG. 13.

As shown in FIG. 13, the longitudinal support 43 of the conveyor frame 9 can be completely or partially formed as walls composed of articulated parallel linkages which include cross articulated bars 44 connected with each other in upper knee points 50, lower knee points 51 and cross points 52. The thus-formed walls are connected at their ends through a fixed pivotal point 45 and a displaceable pivotal point 46 to supports 47. The supports 47 have connecting plates 54 to which the walls are connected above by the fixed pivotal point 45 and below by the displaceable pivotal point 46 which moves in a guide 55.

The supporting roller 6 and 7 for the upper run 1' of the carrying belt 1 as well as the supporting rollers 8 for the lower run 1" of the carrying belt are mounted on a roller frame 48 which are pivoted in a plane of the fixed pivotal point 45 of the thus-formed walls and is held in the plane of the displaceable pivotal point 46 of the guide 49. Thereby the roller frames are held parallel to one another. After loading of the carrying belt the walls formed as a parallel linkage can be more or less stretched. Thereby, it is possible to manufacture structural units which can be utilized for different loading conditions without performing constructive changes thereof. Such structural units which have at least two supporting frames 47 and the walls formed by parallel linkage therebetween, can be provided with similar longitudinally adjustable drive unit 10.

Figure 15:
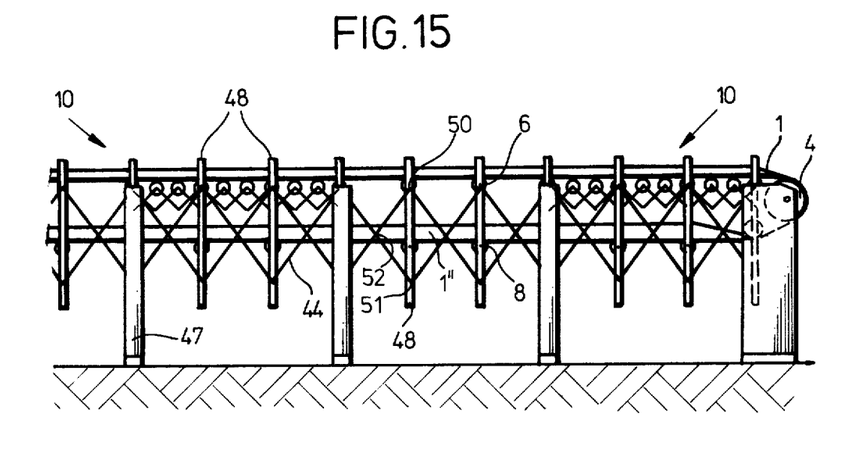
FIG. 15 is a diagrammatic view of a belt conveyor with adjustable frame and drive units.
Figure 16:
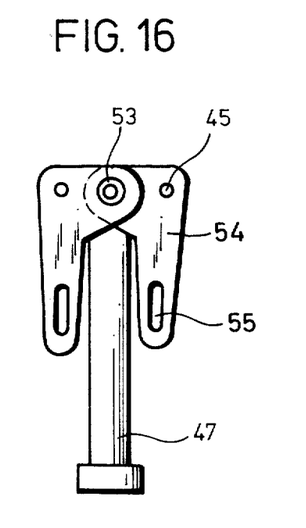
FIG. 16 is a view showing a terrain-following support for the conveyor frame.

FIG. 15 is a diagrammatic view of the inventive belt conveyor. The part shown in this Figure has three structural units, two of which are provided with a drive unit 10. The ends of the side walls of the drive units 10 are similarly supported on the supports 47 of the conveyor frame. In order to provide for matching of the conveyor frame to the contours of terrain over which the conveyor passes, at least a pair of connecting plates 54 may be mounted on the support 47, pivotable about a horizontal axis 53 (FIG. 16). Thereby, it is possible for the plane of the supporting rollers 6 of one structural part to be pivoted by 2 or 3 grades relative to the next following part.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A belt conveyor, comprising a carrying belt unit which includes an endless carrying belt having an upper load-carrying run adapted to carry loads and movable in a direction of transportation, and a plurality of supporting rollers arranged to support and guide said load-carrying run of said carrying belt unit; a friction belt unit which includes an endless friction belt having an upper run which is movable in said direction and is in frictional contact with said load-carrying run of said carrying belt, a plurality of bearing rollers arranged to support and guide said one run of said friction belt, and a plurality of deviating rollers which are located between and offset downwardly relative to said bearing rollers so that said one run of said friction belt moves about said deviating rollers and is alternately guided by the same into and out of frictional contact with said load-carrying run, said upper run of said friction belt being guided by said bearing rollers and some of said deviating rollers; a frame having side walls which are formed as a parallel linkage mounting said bearing rollers and said deviating rollers on said frame and including a plurality of flat bars which cross and are articulately connected with each other, said parallel linkage having upper knee points in which axes of said bearing rollers are located, and cross points in which axes of said deviating rollers are located; and a conveyor frame including a plurality of uprights and two longitudinal walls formed as a further parallel linkage extending between two adjacent uprights and each having a plurality of bars which cross and are articulately connected with each other, said longitudinal walls having end portions each connected to a respective one of said uprights, each of said end portions being connected to a respective one of said uprights by a fixed pivot extending in one plane and a displaceable pivot extending in another plane.

2. A belt conveyor as defined in claim 1, wherein said bars of said further parallel linkage are connected with each other by further pivots; and further comprising a plurality of further frames arranged to receive said supporting rollers and each in said one plane of said fixed pivot articulately connected with said further pivots, and in the other plane of said displaceable pivot movably guided in a guide of a respective one of said further pivots.

3. A belt conveyor as defined in claim 2, wherein said side walls formed by said first-mentioned parallel linkage are supported on two adjacent uprights of said conveyor frame.

4. A belt conveyor as defined in claim 3, wherein each of said uprights has at least two connecting plates which are pivotal about a horizontal axis and each provided with said fixed pivot and with said guide for said displaceable pivot.

* * * * *